United States Patent [19]

Schroeder

[11] 4,306,712

[45] Dec. 22, 1981

[54] DOCUMENT SHUNT MECHANISM FOR A DOCUMENT TRANSPORT SYSTEM

[75] Inventor: Dale W. Schroeder, Iowa City, Iowa

[73] Assignee: Westinghouse Electric Corp., Pittsburgh, Pa.

[21] Appl. No.: 88,304

[22] Filed: Oct. 25, 1979

[51] Int. Cl.³ ............................................. B65H 29/58
[52] U.S. Cl. ..................................... 271/298; 271/303
[58] Field of Search ............... 271/298, 303, 305, 302, 271/279, 288–290, 297; 198/437

[56] References Cited

U.S. PATENT DOCUMENTS

| Re. 28,660 | 12/1975 | Pettet | 271/303 X |
| 3,430,784 | 3/1969 | Hall | 271/298 X |
| 3,709,480 | 1/1973 | Schülze et al. | 271/298 X |

Primary Examiner—Bruce H. Stoner, Jr.
Attorney, Agent, or Firm—M. P. Lynch

[57] ABSTRACT

A document entering a document transport system is assigned an address identification corresponding to a storage location in a shunt command storage member and the shunt command information at the designated location is addressed as the document approaches a document shunt location to determine if the document is to be shunted or permitted to continue in the transport.

1 Claim, 3 Drawing Figures

U.S. Patent  Dec. 22, 1981  4,306,712
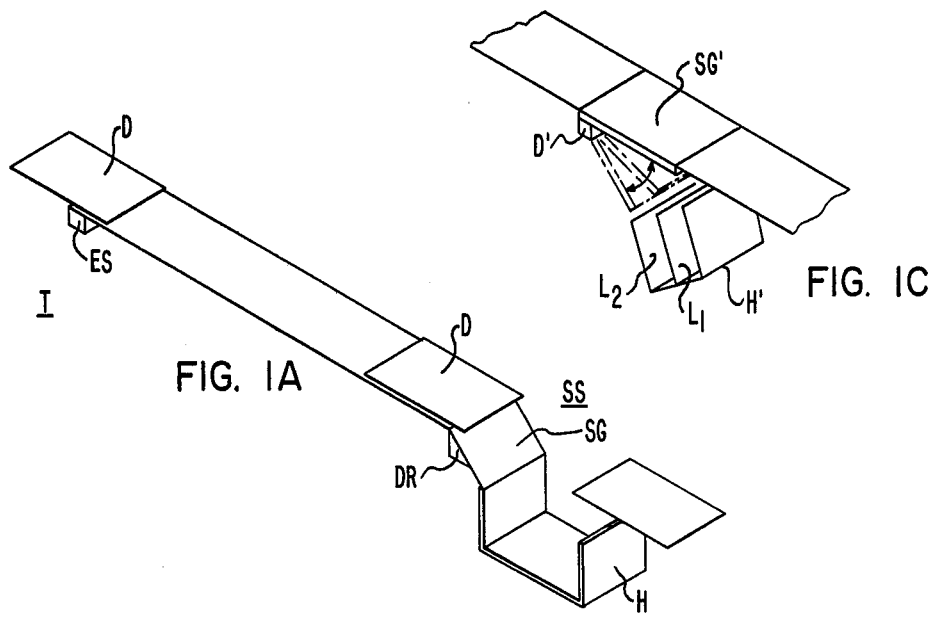
FIG. 1A
FIG. 1C
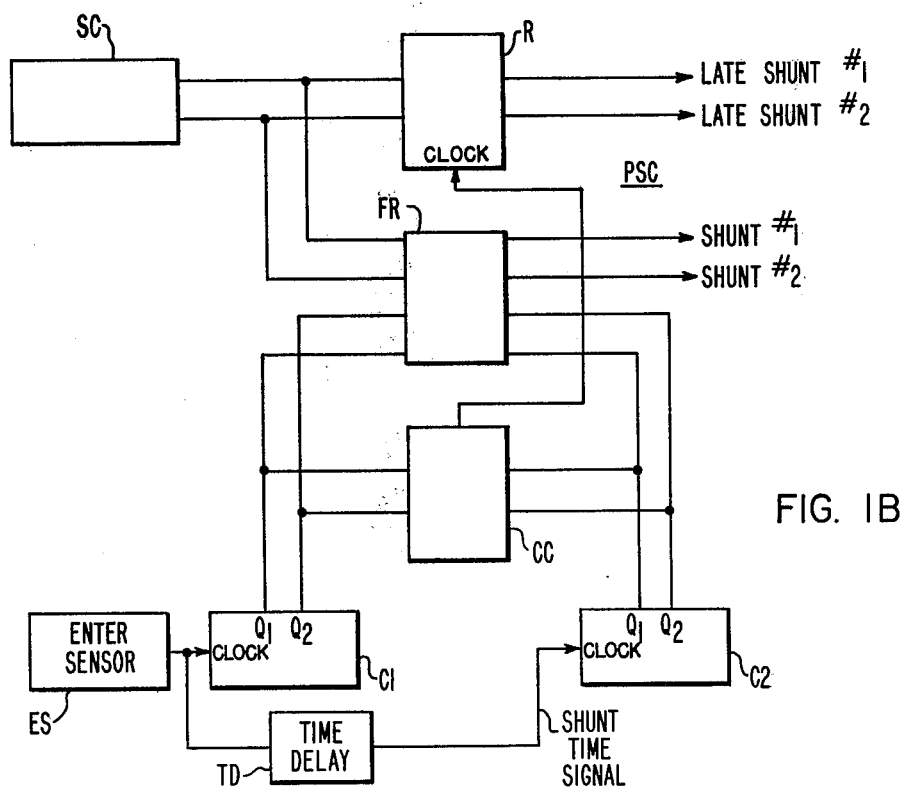
FIG. 1B

DOCUMENT SHUNT MECHANISM FOR A DOCUMENT TRANSPORT SYSTEM

BACKGROUND OF THE INVENTION

In document handling or transport systems associated with document reading or scanning apparatus it is often desirable to selectively shunt documents into different hoppers or output trays. Typically there are several such shunting locations in a given document transport system, thus requiring accurate timing of the gates associated with the respective shunting locations to assure that the proper document shunt occurs.

SUMMARY OF THE INVENTION

There is described herein with reference to the accompanying drawings a shunting technique wherein each document entering the transport system is assigned a binary number corresponding to an address location in a register file within which is stored corresponding shunt commands. A document sensor communicates the presence of the document at a position just prior to a shunt location to the register file to determine if a shunt command for the particular document is in storage. If the address location within the register file corresponding to the specific document contains a shunt command, an actuator is activated and the document is shunted to a hopper defined by the stored shunt command.

BRIEF DESCRIPTION OF THE DRAWING

The invention will become exemplary description in connection with the accompanying drawings:

FIGS. 1A and 1C are schematic illustrations of document transports incorporating the inventive features: and FIG. 1B is a block diagram schematic illustration of the circuitry associated with the document transport of FIGS. 1A and 1C.

DESCRIPTION OF THE PREFERRED EMBODIMENT

Referring to FIG. 1A, there is schematically illustrated a document transport T for transporting a document D for loading into a paper hopper H associated with a paper shunt station SS in response to an output signal from the paper shunt control circuitry functionally illustrated in the block diagram of FIG. 1B.

As a document D enters the document transport T, an enter sensor ES acknowledges the presence of the document and supplies an input to the counter C1 of the paper shunt circuit PSC. The counter C1, which may be typically implemented through use of a commercially available counter type 8281, is incremented by the input and assigns an address identification to the document D which corresponds to a storage location in the file storage register FR. The storage register FR may be implemented through commercially available register type No. 74170. A shunt command input is derived from a shunt command input means SC which may be a central computer or an operator-initiated console. The shunt command input is an instruction to shunt the particular document into a hopper associated with a shunt station SS of the transport T. In the embodiment illustrated in the drawings, the shunt command associated with a particular document D may be a command to shunt the document into the hopper H or to transport the document to a final document collection location of the transport T. The storage register FR remains open at the address location assigned to the document D until such time that the shunt command results in a shunting of the document D, or until another document enters the transport T and is sensed by the enter sensor ES.

As the document D approaches the shunt station SS a shunt time signal generated by the time delay circuit TD clocks counter C2. The time delay circuit TD responds to the output of enter sensor ES by supplying a clock increment input to the counter C2 at a time delay corresponding to the time of travel of the document D from the enter sensor ES location of the transport T to a transport location just prior to the shunt station SS. The output of counter C2, which may be implemented by counter type 8281, addresses the shunt command information stored at the corresponding location of the file register FR which is associated with the document D. This information, when retrived from the storage location is transmitted as a gate driver signal to the shunt gate driver DR for controlling the opening and closing of the shunt gate SG of the shunt station SS. In the event the stored shunt command is an instruction to shunt the document D into the hopper H, the shunt gate driver DR will cause the shunt gate SG to open and divert the document D into the hopper H.

When the shunt command arrives so late that it cannot be stored in the register FR and consequently too late for the document D to be shunted to the appropriate hopper, the circuit responds with the signals marked LATE SHUNT #1, LATE SHUNT #2, etc. These late command conditions are checked at the time determined by the SHUNT TIME SIGNAL from time delay circuit TD which increments the counter C2 to the same state as counter C1 which is incremented by the enter signal of sensor ES. These equal state conditions exist until the next document enters the transport T. The equal state conditions of the counters C1 and C2 are detected by the comparator CC whose output checks the late command data if present in the register R. At this point the late shunt data is supplied to the computer or operator's console. The comparator CC can be implemented by a commercially available type No. 7485.

While the hopper H associated with the embodiment of the transport system T of FIG. 1A illustrates a single hopper location, it is apparent that a multiple location hopper H', as illustrated in FIG. 1C, can be employed and the control circuitry associated with the gate driver D' for controlling the movement of the shunt gate SG' can be designed to respond to a first shunt command signal by locating a document in the first level L1 of the hopper H', and a second shunt command by locating the document D in the second level L2 of the hopper H'.

Similarly, separate spaced-apart shunt station locations can be provided with separate hoppers along a given transport to permit selective shunting of the document.

I claim:

1. In a document handling system including a document transport for moving a document through the document handling system and including at least one document shunting station whereby a given document may be selectively shunted into a given document hopper, the improvement for electronically controlling the shunting of a document into a predetermined hopper, said improvement comprising:

a document sensor means for detecting a document entering the document transport and generating a signal indicative thereof, a first counter circuit means, said first counter circuit means being incremented by the output signal of said document sensor means and assigning an address identification to the document entering the document transport, a storage means comprising a plurality of storage locations each capable of storing a document shunt command signal, said address identification associated with said document corresponding to one of said storage locations, shunt command input means for entering document shunt information into a predetermined storage location of said storage means, a time delay circuit means responding to the output signal of said document sensor means by generating a time delay signal after a predetermined time delay corresponding to the anticipated time of travel of the document from the location of the transport corresponding to said document sensor to a location approximating the document shunt station, a second counter circuit means responding to said time delay signal by addressing the storage location of said storage means corresponding to the address identification of said document and retrieving the information stored at said address location in said storage means, and a shunt station actuator means operably connected to said transport and said second counter circuit means to control the operation of said shunt station in response to the information retrieved from said storage means.

* * * * *